(12) United States Patent
Paulmann et al.

(10) Patent No.: US 7,717,699 B2
(45) Date of Patent: May 18, 2010

(54) FEED NOZZLE FOR INJECTION-MOLDING MACHINE

(75) Inventors: Dirk Paulmann, Lüdenscheid (DE); André Kabbert, Lündenscheid (DE)

(73) Assignee: Hasco Hasenclever GmbH & Co KG, Ludenscheid (DE)

( * ) Notice: Subject to any disclaimer, the term of this patent is extended or adjusted under 35 U.S.C. 154(b) by 132 days.

(21) Appl. No.: 11/974,679

(22) Filed: Oct. 15, 2007

(65) Prior Publication Data
US 2008/0095880 A1   Apr. 24, 2008

(30) Foreign Application Priority Data
Oct. 13, 2006   (DE) ........................ 10 2006 049 073

(51) Int. Cl.
*B29C 45/23* (2006.01)
(52) U.S. Cl. ..................... 425/564; 264/328.9; 425/566
(58) Field of Classification Search ................. 425/562, 425/563, 564, 565, 566; 264/328.9, 328.15
See application file for complete search history.

(56) References Cited
U.S. PATENT DOCUMENTS 4,053,271 A * 10/1977 Gellert ........................ 425/562
4,238,182 A    12/1980 Mollier
4,781,572 A    11/1988 Boring
5,460,763 A *  10/1995 Asai ............................ 425/564
6,273,706 B1 * 8/2001 Gunther ....................... 425/564

FOREIGN PATENT DOCUMENTS

DE   196 08 676   1/1997
DE   38 33 220    4/1998

* cited by examiner

*Primary Examiner*—Tim Heitbrink
(74) *Attorney, Agent, or Firm*—Andrew Wilford

(57) ABSTRACT

A nozzle is used with a mold formed with a rearwardly open recess having an apex at which opens a gate orifice. The nozzle has a body rearwardly closing the recess. The body is centered on an axis aligned with the orifice and formed with an axially extending central passage adapted to receive a hot melt. The body has a tip spacedly received in the recess and itself formed with at least one radially throughgoing branch passage extending from the central passage and opening into the recess at a location spaced as far as possible from the gate orifice. The tip also is formed with a throughgoing bore axially aligned with the gate orifice. A nozzle pin is axially shiftable in the body by an actuator between an extended position projecting from the bore and fitting into and blocking the gate orifice and a retracted position unblocking the orifice.

17 Claims, 4 Drawing Sheets

FEED NOZZLE FOR INJECTION-MOLDING MACHINE

FIELD OF THE INVENTION

The present invention relates to an injection molding machine. More particularly this invention concerns a closable feed nozzle for such a machine.

BACKGROUND OF THE INVENTION

A standard injection molding machine feeds a hot plasticized melt through a nozzle to a mold. The mold has a cavity open to the outside at a gate orifice that the nozzle is fitted to in order to inject the melt under pressure into the cavity. The nozzle is provided with a valve structure so that flow of the melt can be interrupted as the mold is opened and the previously formed workpiece is removed.

In order to insulate the nozzle, which must be kept very hot to maintain the melt molten, from the mold, which must be as cool as possible to speed curing of the plastic, the mold is formed around the gate orifice with a cup-shaped recess that is generally complementary to but somewhat larger than a top of the nozzle, so that the nozzle tip, when fitted in the recess, does not directly touch the mold. Such a system is known from DE 196 08 676. Here the melt is fed from a central melt passage via at least one a short oblique bore to the recess into whose apex opens the gate orifice. A pin in the nozzle can move between an extended position in which it projects from the nozzle tip and fits into the gate orifice and a retracted position pulled back from the gate orifice. When the pin engages in the gate orifice it has a valve function and blocks flow from the recess into the mold cavity, and when retracted it allows such flow. In this system the gap formed by the cavity between the nozzle tip and the mold has a significant insulating function, as the heat capacity of the melt is very small compared to that of the metal nozzle and mold.

U.S. Pat. No. 4,781,572 describes another such injection nozzle where the melt is fed to oblique bores via a central melt passage, the bores being provided in the nozzle tip and ending in a cup-shaped recess. Here also, the melt is fed through the recess to a gate orifice of the recess that can be closed by means of a pin. In a region adjacent the end of the pin at the mouth of gate orifice, the pin is formed around its entire circumference with an annular groove so that the pin in this region has a smaller diameter. Axial shifting can align either the small-diameter region or the bigger end region with the mouth of the gate orifice. If the bigger end region is at the mouth of the gate orifice, the gate orifice is closed, so that no melt can enter the mold cavity. If, however, the small-diameter groove region is aligned with the mouth of the gate orifice, an annular space is formed between the mouth of the gate orifice and the outside surface of the pin, and the melt can pass through the gate orifice via this space to the mold cavity. With this system, the oblique bores of the nozzle tip end close to the gate orifice of the nozzle in the recess, that is near the apex of the recess.

In practice it has been shown that during injection molding a number of molding cycles are necessary after a dye change until the molded part no longer has any of the old dye. It takes several cycles to flush all the old plastic out of the recess, wasting product and making workpieces that cannot be used.

OBJECTS OF THE INVENTION

It is therefore an object of the present invention to provide an improved feed nozzle for an injection-molding machine.

Another object is the provision of such an improved feed nozzle for an injection-molding machine that overcomes the above-given disadvantages, in particular that ensures an efficient flushing of the recess formed between the mold and the nozzle.

SUMMARY OF THE INVENTION

The instant invention is a nozzle used in combination with an injection-molding mold formed with a rearwardly open cup-shaped recess having an apex at which opens a gate orifice connected to a mold cavity. The nozzle has according to the invention a nozzle body engaging the mold and rearwardly closing the recess. The body is centered on an axis aligned with the orifice and formed with an axially extending central passage adapted to receive a hot melt and having an outer outlet end. The body has a forwardly projecting tip spacedly received in the recess and itself formed with at least one radially throughgoing branch passage extending from the central passage and opening into the recess at a location spaced as far as possible from the gate orifice. Thus the melt can flow from the central passage through the branch passage to the recess and thence through the gate orifice into the mold cavity. The tip also is formed with a throughgoing bore axially aligned with the gate orifice. A nozzle pin is axially shiftable in the body by an actuator between an extended position projecting from the bore and fitting into and blocking the gate orifice and a retracted position unblocking the orifice.

Thus according to the invention the outlet end of the branch passage opens into the cup-shaped recess at a region that is as far removed as possible from the gate orifice of the recess. The important aspect is that the outlet end is disposed such that during a molding cycle the melt held in the recess is completely flushed into the gate orifice by the subsequent melt flow from the outlet end. The outlet end is provided in the region of the recess end face formed, for example, by a seal ring delimiting the cup-shaped recess. If a plurality of bores of the nozzle tip end in the recess, all the outlet ends are provided in the afore-mentioned region.

"Cup-shaped" as defined by the invention can mean any bowl shape in the broadest sense. The recess may, for example, be spherical or a part-spherical shell. The recess may have a parabolic cross-section, for example. Alternatively, the recess may also take on any other bowl shape. The terms "cavity end face" and "apex" within the meaning of the invention indicate the rear end or front apex of the bowl-shaped cavity.

The "gate orifice" as defined by the invention is the end of a passage that directly connects the cup-shaped recess to the mold cavity where a workpiece is formed. The "apex region" is the region in which the gate orifice is provided.

The "end face" is the region that with respect to the flow path of the molten plastic material that is as far removed as possible from the apex region of the recess in which the gate orifice is provided. "As far as possible" shall be interpreted with respect to flow through the cavity from the outlet end of the branch passage to the gate orifice. The end face may be formed, for example, by an annular shoulder of the nozzle body or the nozzle tip or, for example, by a seal ring.

An advantage of the invention is that during a dye change the plastic material in the recess is completely flushed out of the recess by the subsequently following plastic material. If, following a material or dye change, the previously used material or the material with the previously used dye is still located in the recess, this material can be completely purged from the recess by the new material during just one molding cycle. As a result, fewer rejects containing residue of the previously used dye or the previously used material are produced. The previously used material or the material with the previously used dye is quickly removed from the nozzle, and the tool is operational more quickly for the production of flawless parts.

According to a first embodiment, the branch passage expands conically in the flow direction. The outlet end of the branch passage is larger than the inlet end of the branch passage, as a result of an increasing flow cross section of the branch passage outward from the axis. This way, melt flow is across a large cross-section at the outlet end, this flow displacing the material in the recess. Due to the conical widening, the flow velocity of the molten plastic material in the branch passage decreases. The slower flow velocity creates improved fountain flow that expands toward all sides as the plastic melt exits the outlet end and then displaces the plastic melt located in the recess also from spaces between the outlet ends of the branch passages.

According to a further embodiment of the invention, the end face of the recess is bounded by a surface of a seal ring. The recess can be bounded by the face of the seal ring, for example.

According to a further embodiment of the invention, the bottom surface merges smoothly into a concave annular surface of the nozzle tip. In this way, gussets or undercuts are avoided. These are spaces that plastic material can get into so that during a molding cycle it is not or not entirely flushed out of the recess. Due to the design according to the invention, in the region of the recess there are no spaces in which no or only little exchange of the plastic material located in the recess occurs.

According to a further embodiment of the invention, the seal ring is made of a material with low thermal conductivity. The sealing can be made of titanium, for example, so that heat transfer from the injection nozzle to the mold plate is reduced. It is also possible, however, to use stainless steel or other suited materials with low thermal conductivity.

According to a further embodiment, at least two branch passages are distributed around the circumference. It is also possible that a plurality of branch passages are distributed around the circumference of the nozzle tip. If two or more outlet ends are provided from the nozzle tip, the intermediate spaces between the outlet ends are so small that the melt located there is completely purged during the subsequent molding cycle. In this case, flawless parts can be produced particularly quickly after a dye or material change. According to an advantageous embodiment, the largest possible number of branch passages is distributed around the circumference of the nozzle tip.

In a further embodiment, the outlet ends are distributed uniformly around the circumference of the nozzle tip. By distributing the outlet ends uniformly around the circumference of the nozzle tip, for example, areas are not formed between two outlet ends from which material is purged only by a large number of molding cycles.

According to a further embodiment, the nozzle pin has a stroke that can be, for example, 1 to 4 mm, particularly 2 mm. Due to the small pin stroke, the length of the nozzle pin projecting from the nozzle tip can be small. In this way, movements of the free end of the nozzle pin transversely to the longitudinal axis of the injection nozzle are prevented.

According to a further embodiment of the invention, the nozzle pin comprises a front region by means of which a gate orifice of the mold cavity can be blocked, the nozzle pin being centered adjacent the front region by means of a guide. "Centered by means of a guide" within the meaning of the invention means that the pin, particularly due to the small pin stroke, is guided in every position and always in contact with the guide. Due to the small stroke and the guiding and centering of the nozzle pin close the gate orifice, the length of the pin tip projecting out of the nozzle tip is small. Guiding and centering of the nozzle pin close to the gate orifice additionally mean that lateral movements of the nozzle pin transverse to a longitudinal axis of the injection nozzle are prevented or minimized. Lateral movements of the nozzle pin should be avoided because contact of the front region of the nozzle pin with a region of the mold plate adjacent the gate orifice results in increased wear of the nozzle pin.

According to a further embodiment of the invention, the guide is configured as a bearing. The bearing may be formed by a cylindrical wall receiving the nozzle pin, for example. Thus the guide is formed by the cylindrical inside surface of a bore in the nozzle tip. The nozzle tip can be received snugly in the bore so that movement of the nozzle pin transverse to the longitudinal axis is avoided. The inside surface of the throughgoing bore may be surface treated. In addition, the inside surface of the bore may be coated.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
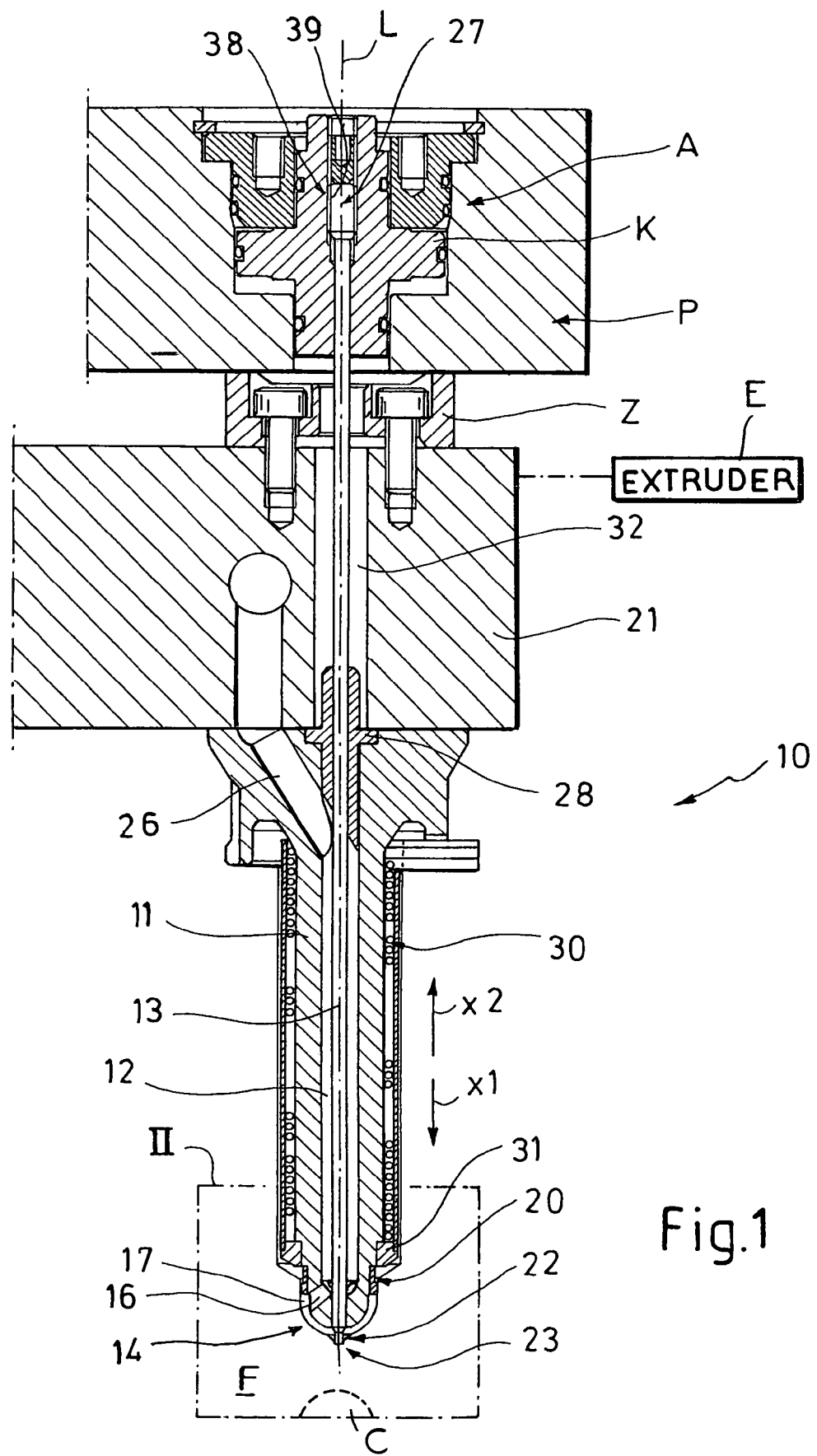
FIG. 1 a partly diagrammatic section through a molding system according to the invention.

As seen in FIG. 1, an injection-molding nozzle 10 has a basically tubular nozzle body 11 with a central melt passage 12 coaxially a nozzle pin 13, all centered on a longitudinal axis L. The nozzle 10 is carried on a runner plate 21 coupled to a diagrammatically illustrated extruder E and carrying an actuator A for the nozzle pin 13. Molten plastic material arriving from the heated runner 21 is fed to a mold cavity C via a gate orifice 22 in a mold plate F by means of the injection nozzle 10. To this end the mold plate F is formed with a semispherical recess 17 centered on the axis L and at an apex 19 of which is provided the gate orifice 22. The outer surface of the normally steel mold plate F is spaced from the outer surface of the generally semispherical tip of the nozzle 11 in this recess 17.

Figure 2:
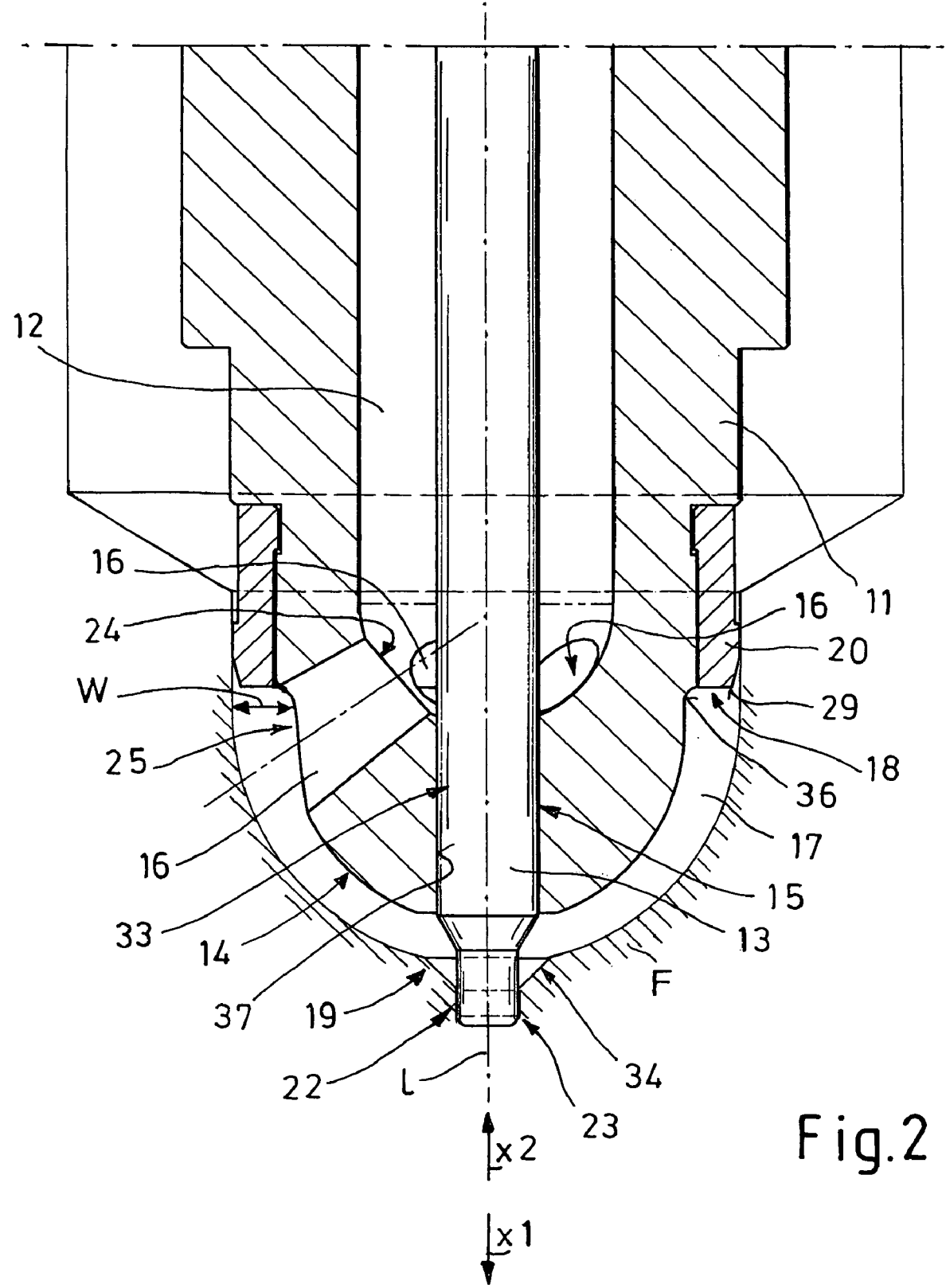
FIG. 2 is a large-scale view of the detail indicated at II in FIG. 1.
Figure 3:
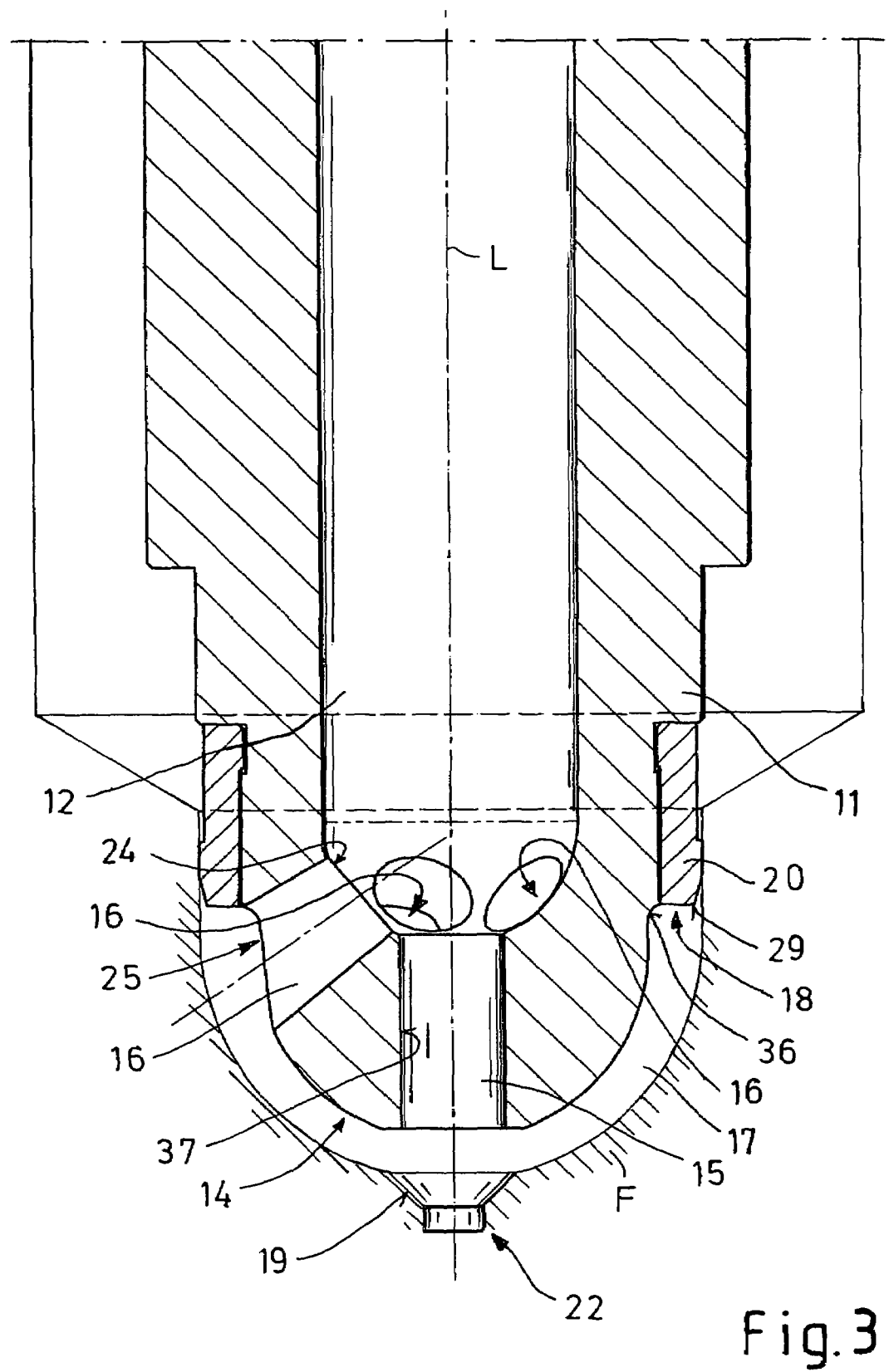
FIG. 3 is a view like FIG. 2, but with the nozzle pin not shown.
Figure 4:
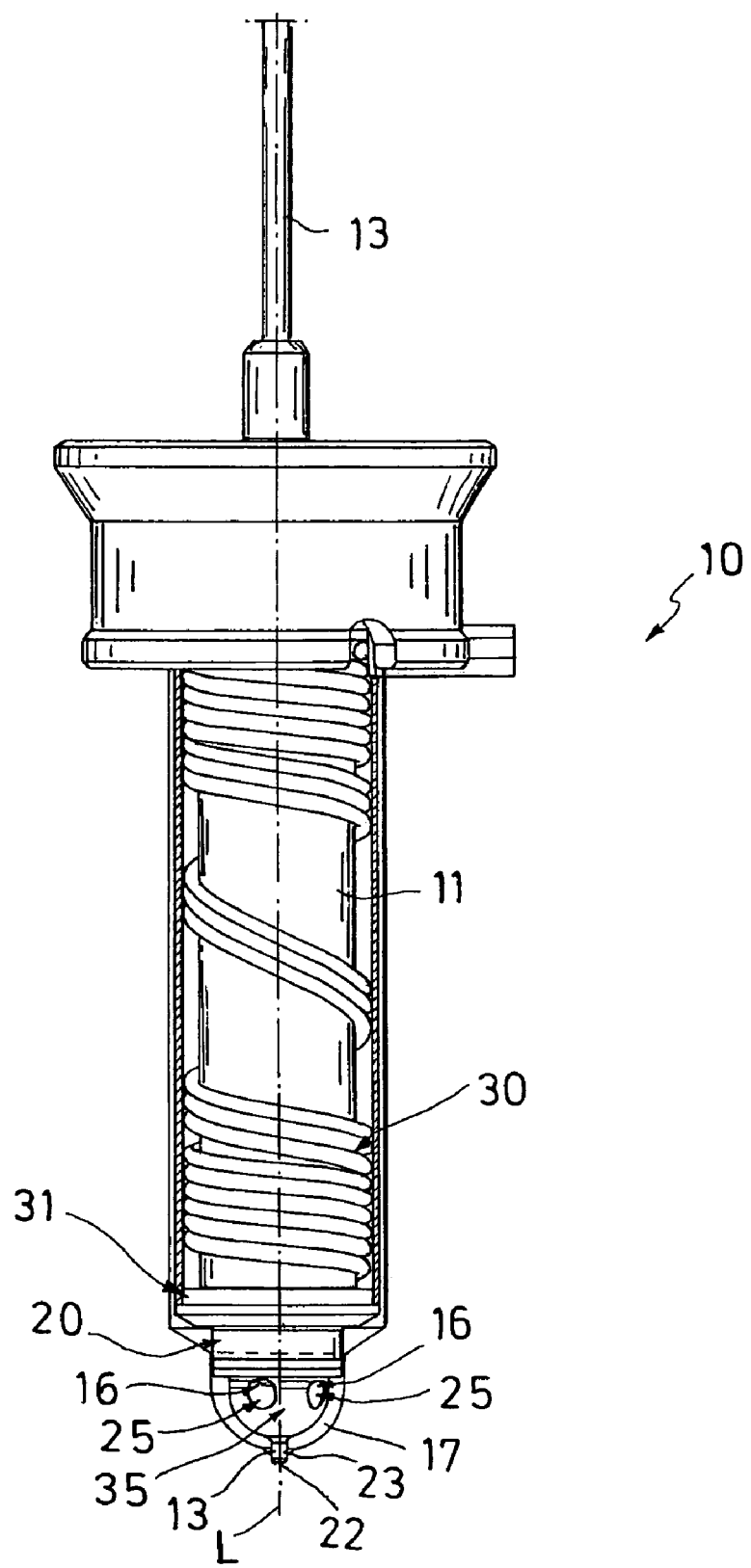
FIG. 4 is a side elevational view of the nozzle according to the invention.

The nozzle pin 13 serves the block and unblock the gate orifice 22. To open and close the gate orifice 22, it can be shifted along the longitudinal axis L of the injection nozzle 10 in forward and rearward directions x1 and x2. In FIGS. 1 and 2, the nozzle pin 13 is shown in a closed position in which a cylindrical tip or front end 23 of the nozzle pin 13 is fitted in the gate orifice 22 and thereby closes it. The gate orifice 22 is provided with a frustoconical centering taper 34 for the nozzle pin 13 (see FIG. 2).

By moving the nozzle pin 13 from the position shown in FIGS. 1 and 2 in the rearward direction x2, the nozzle pin 13 can be displaced into an unillustrated open position in which the front end 23 is moved out of the gate orifice 22. If the nozzle pin 13 is in this open position, molten plastic can flow via the gate orifice 22 through the recess 17 into the mold cavity C. The pin stroke during the displacement of the nozzle pin 13 from the open to the closed position is approximately 2 mm and is thus relatively small.

According to FIG. 1, the nozzle pin 13 is moved by a piston K of the actuator A, which is provided in a chamber of a clamping plate P. The nozzle pin 13 is connected to the plunger K by an end region 27 provided with an external screwthread 38. The external thread 38 is screwed into an internal thread 36 of the plunger K of the actuator A. When the plunger K is displaced in one of the directions x1 or x2 in a manner that is not shown in detail here, the nozzle pin 13 also moves in the corresponding direction x1 or x2.

According to FIG. 1, the nozzle pin 13 extends through an intermediate plate Z, a bore 32 in the hot runner 21, a bearing bushing 28 secured in the nozzle body 11, the central melt passage 12 of the nozzle body 11, and a bore 15 in a tip 14 of the nozzle body 11. The front end 23 of the nozzle pin 13 can project axially from the nozzle tip 14.

The nozzle pin 13 is guided received in a central region in the bearing bushing 28, while a region 33 of the nozzle pin 13 (see FIG. 2) is slidably guided and centered by an inside wall 37 of the bore 15. Guiding the nozzle pin 13 close to the gate orifice 22 has the advantage that the portion of the needle tip 23 projecting from the nozzle tip 14 is very short. Due to this shortness, movements of the end 23 of the nozzle pin 13 transverse to the longitudinal axis L of the injection nozzle 10 are minimized and thus wear of the nozzle pin 13 due to contact with the mold plate F is reduced.

As shown in FIG. 1, the melt arriving from the hot runner 21 during a molding cycle is fed to the central melt passage 12 via an infeed bore 26. A plurality of angularly equispaced branch passages 16 branch off the central melt passage 12 and open into the cup-shaped recess 17 according to FIGS. 1 to 4.

In the illustrated embodiment, five branch passages 16 are provided, although more or fewer are possible. Outlet ends 25 of the branch passages 16 are distributed uniformly around the circumference of the nozzle tip 14. Since the nozzle pin 13 is a snug fit in the bore 15, the melt cannot reach the recess 17 through this bore 15. The outlet ends 25 are circular and tangent an upper or rear end of the chamber formed by the recess 17, that is they are spaced as far as possible from the gate orifice 22 at the apex 19 of the recess 17.

At an upper end region 18 (see FIG. 2), the recess 17 is closed by means of a seal ring 20. The seal ring 20 is attached to the nozzle body 11 and extends radially between the nozzle body 11 and the mold plate F. Thus, a face 29 of the seal ring 20 in the end region 18 upwardly delimits the cup-shaped recess 17. The seal ring 20 is made of insulating material, for example titanium. This way, heat transfer from the injection nozzle 10 to the mold plate F via the ring 20 is largely avoided.

The branch passages 16 expand conically downstream (see FIGS. 2 and 3), that is outward from the axis L, so that every branch passage 16 has a smaller diameter at its inlet 24 than at its outlet end 25. This increasing flow cross-section results in a decreased flow velocity in the branch passage 16. Due to the lower flow velocity at the outlet end 25 compared to the access opening 24, an advantageous fountain flow of the plastic melt is produced.

The fountain flow causes the plastic melt to expand toward all sides into the recess 17 on exiting the branch passage 16 and displaces the plastic material present there. The enlarged diameter of the outlet end 25 likewise brings about an improved flushing effect because webs 35 between the outlet ends 25 are of minimal dimensions. Fountain flow is also supported by an increased clearance width W of the recess 17 in the end face 18 of the recess 17.

As described, above, the outlet ends 25 directly abut the seal ring 20. The face 29 of the seal ring 20 that delimits the recess 17 in the end face 18 merges into a concave annular surface 36 of the nozzle tip 14. This way, spaces in which the plastic melt can collect are reduced without the melt being completely displaced from the recess 17 by the subsequently following plastic melt of the subsequent molding cycles.

According to the invention, for example during a dye change, molten material in the recess 17 is completely flushed out by the subsequently following molten material, so that even after only a single or just a few molding cycles no undesirable melt residue comprising a previously used dye or a different material is present in the mold.

It shall also be mentioned that the injection nozzle 10 is temperature-controlled by means of a heater 30 configured as a tubular heating element and that a thermal sensor ring 31 is provided at the nozzle body 11 to measure the temperature and allow it to be controlled by means of an unillustrated controller.

Furthermore, it shall be mentioned that alternatively to the illustrated embodiment the nozzle tip may also be configured as a separate part and may be screwed to the nozzle body 11.

We claim:

1. In combination with an injection-molding mold formed with a rearwardly open cup-shaped recess having an apex at which opens a gate orifice connected to a mold cavity, a nozzle comprising:
    a nozzle body centered on an axis aligned with the orifice and formed with an axially extending central passage adapted to receive a hot melt, the body having a forwardly projecting tip spacedly received in the recess and itself formed with at least one radially throughgoing branch passage extending radially from the central passage and opening radially outwardly directly into the recess at a location spaced as far as possible from the gate orifice, whereby the melt can flow from the central passage through the branch passage to the recess and thence through the gate orifice into the mold cavity, the tip also being formed with a throughgoing bore axially aligned with the gate orifice;
    a nozzle pin axially shiftable in the body between an extended position projecting from the bore and fitting into and blocking the gate orifice and a retracted position unblocking the orifice; and
    actuator means for shifting the pin between its positions.

2. The injection nozzle defined in claim 1 wherein the branch passage widens conically radially outward from the axis.

3. The injection nozzle defined in claim 1 wherein the recess has a rear end face and the outlet end of the branch passage is immediately juxtaposed with the rear end face.

4. The injection nozzle defined in claim 3 wherein the outlet end is circular and tangents the rear end face.

5. The injection nozzle defined in claim 3, further comprising
    a seal ring surrounding the tip, bearing on the mold, and forming the rear end face.

6. The injection nozzle defined in claim 5 wherein the seal ring is of a thermally insulating material.

7. The injection nozzle defined in claim 5 wherein the seal ring is of titanium.

8. The injection nozzle defined in claim 3 wherein the nozzle tip has a concave annular surface merging with the end face.

9. The injection nozzle defined in claim 1 wherein a flow cross section of the branch passage increases radially outward away from the axis.

10. The injection nozzle defined in claim 1 wherein there are a plurality of the branch passages angularly spaced about the tip.

11. The injection nozzle defined in claim 10 wherein the branch passages are angularly equispaced about the tip.

12. The injection nozzle defined in claim 1 wherein the means shifts the pin through stroke of between 2 mm and 4 mm on displacement between its positions.

13. The injection nozzle defined in claim 1 wherein the pin is snugly guided in the bore.

14. The injection nozzle defined in claim 13 wherein the bore is cylindrical and centered on the axis and a portion of the pin engaged in the bore is complementary thereto.

15. The injection nozzle defined in claim 1 wherein the end face is substantially planar and perpendicular to the axis.

16. The injection nozzle defined in claim 1 wherein the tip has a cup-shaped outer surface centered on the axis and generally complementary to an inner surface of the recess.

17. In combination with an injection-molding mold formed with a rearwardly open cup-shaped recess having an apex at which opens a gate orifice connected to a mold cavity, a nozzle comprising:

a nozzle body centered on an axis aligned with the orifice and formed with an axially extending central passage adapted to receive a hot melt, the body having a forwardly projecting tip spacedly received in the recess and itself formed with at least one radially throughgoing branch passage;

a seal ring surrounding and radially inwardly engaging the tip in the recess, bearing radially outward on the mold in the recess, and forming an annular rear end face rearwardly closing the recess, the branch passage extending radially from the central passage and opening into the recess at a location spaced as far as possible from the gate orifice and immediately adjacent the end face, whereby the melt can flow from the central passage through the branch passage to the recess and thence through the gate orifice into the mold cavity, the tip also being formed with a throughgoing bore axially aligned with the gate orifice;

a nozzle pin axially shiftable in the body between an extended position projecting from the bore and fitting into and blocking the gate orifice and a retracted position unblocking the orifice; and actuator means for shifting the pin between its positions.

* * * * *